March 8, 1932.  R. VIOLA  1,848,855
EDUCATIONAL TOY PIANO
Filed Dec. 3, 1930  2 Sheets-Sheet 1
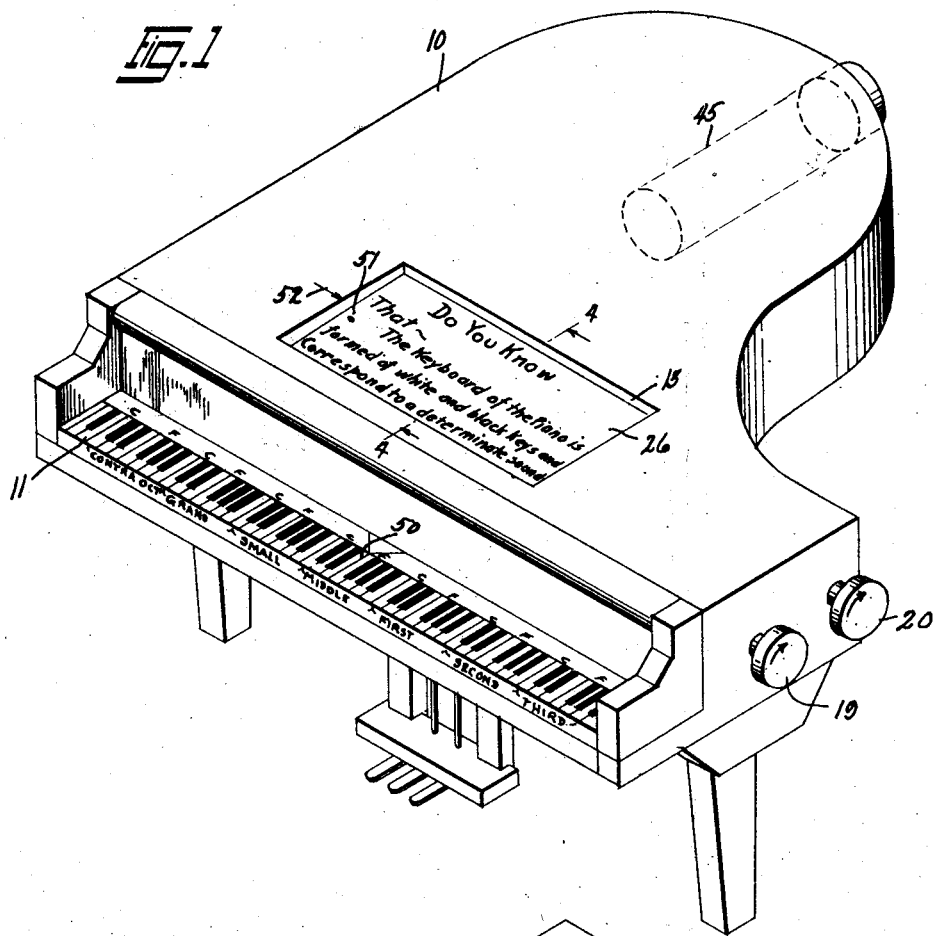
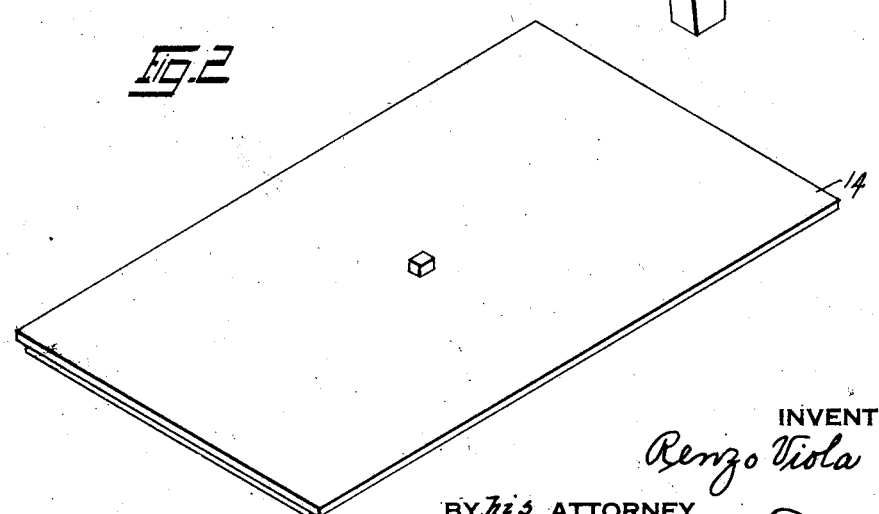
INVENTOR
Renzo Viola
BY his ATTORNEY March 8, 1932.   R. VIOLA   1,848,855
EDUCATIONAL TOY PIANO
Filed Dec. 3, 1930   2 Sheets-Sheet 2
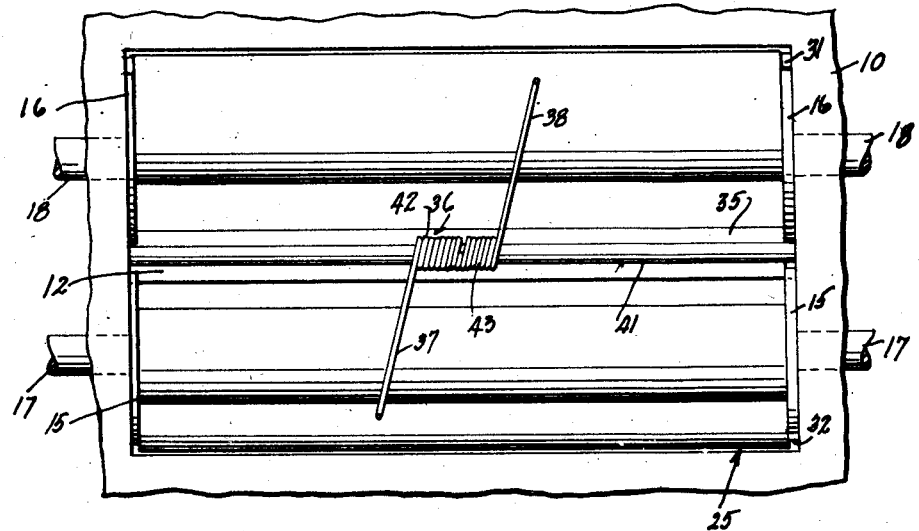
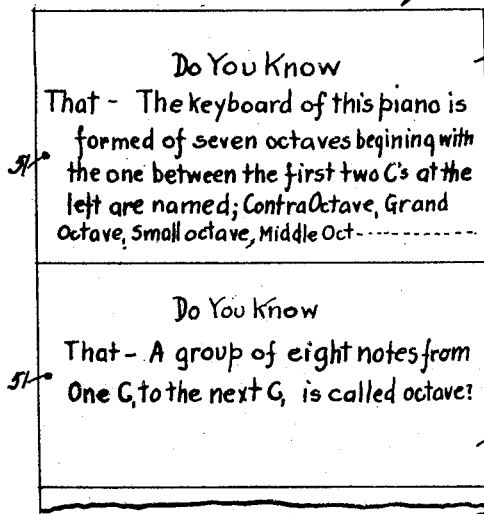
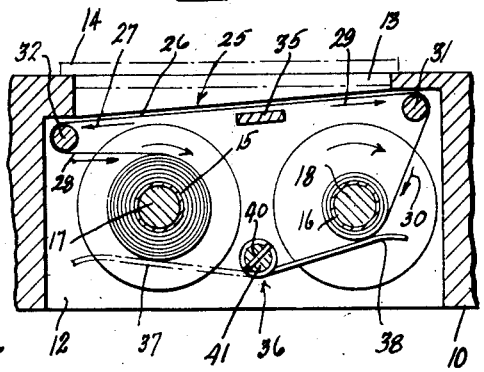
INVENTOR
Renzo Viola
BY his ATTORNEY Patented Mar. 8, 1932

1,848,855

UNITED STATES PATENT OFFICE

RENZO VIOLA, OF NEW YORK, N. Y.

EDUCATIONAL TOY PIANO

Application filed December 3, 1930. Serial No. 499,674.

This invention relates to pianos, and more particularly to educational toy pianos, and has for one of its objects the provision of a piano of the character referred to provided with a scroll or chart of instructions secured to a pair of rollers rotatably mounted in the said piano, the said chart being visible through an opening in the top of the said piano.

Another object of the invention is to subdivide and mark the keyboard of a piano into the various octaves of the scale, to which reference is had in the chart for the purpose of comparison.

A further object of the invention is to provide a piano of the character referred to, the use of which will enable a child or novice to become acquainted with and thoroughly master the various musical signs, keys, octaves, etc.

Other objects and advantages will appear as the nature of the improvements is better understood, the invention consisting substantially in the novel arrangement and co-relation of parts herein fully described, and illustrated in the accompanying drawings, wherein similar reference characters are used to describe corresponding parts throughout the several views, and then finally pointed out and specifically defined and indicated in the appended claims.

The disclosure made the basis of exemplifying the present inventive concept suggests a practical embodiment thereof, but the invention is not to be restricted to the exact details of this disclosure, and the latter, therefore, is to be understood from an illustrative, rather than a restrictive standpoint.

The inventive idea involved is capable of receiving a variety of mechanical expressions, one of which, for the purpose of illustration, is shown in the accompanying drawings, in which Figure 1 is a perspective view of a piano embodying my invention.

Figure 2 is a perspective view of the chart exposing opening cover.

Figure 3 is a bottom plan view of the scroll roller mechanism.

Figure 4 is a sectional view taken on line 4—4 Figure 1, and

Figure 5 is a fragmental view of the instruction chart.

Referring now to the drawings in detail 10 indicates the body portion of a toy piano, provided with a keyboard 11 to the rear of which there is located an opening 12 having an upper reduced or frame portion 13 adapted to be covered by a shouldered cover or lid 14.

Housed within the opening 12 are a pair of flanged rollers or spools 15 and 16 secured to shafts 17 and 18 respectively, rotatably mounted in the said body portion 10, and which terminate at their right ends in knobs 19 and 20. A chart 25 having instruction areas 26 is secured at its ends to the rollers or spools 15 and 16 and is rolled up on the said spools. The said chart is so arranged that by turning the knob 19 in clockwise direction, the said chart will wind up on the roller 15 and travel in the direction indicated by the arrows 27 and 28, and by turning the knob 20 in clockwise direction the chart will unwind from the roller 15 and roll up on the roller 16 and travel in the direction indicated by the arrows 29 and 30. (See Fig 4.)

To obtain this result the chart is passed from the bottom of the roller 16 over the right side and top of a rod 31 at the right of the opening 12 thence over the top and left side of a rod 32 at the opposite side of the said opening 12 and around the right side of the roller 15. A strip 35 is provided in the opening 12 just below the chart for supporting same and prevent its sagging. To prevent the chart from accidentally unrolling or becoming loose on the rollers 15 and 16, I provide a coiled spring 36 one end 37 of which contacts with the portion of the chart on the roller 15 and the opposite end 38 contacts with the portion of the chart wound on the roller 16. This spring 36 is made of a strand of wire which is passed through an opening 40 in the center of a rod 41 secured in the end walls of the opening 12. One end 42 of the said spring is wound from right to left and the opposite end 43 is wound from left to right. An opening 45 is provided at the rear of the body portion 10, in which may be kept a rolled up sheet of music which may be removed therefrom when desired.

In order that a child or other user of the piano may become acquainted with the division of the keyboard, that is the names and location of the various keys and octaves, I pass a line 50 through the center of the said keyboard. It being understood that in a toy piano the keyboard may consist of a strip of material having the keys painted thereon, and mark the third regular key and every eighth regular key thereafter commencing from the left as C. I then mark the octave between the first two C's as Contra octave, the next as Grand octave, then Small octave, Middle octave, First octave, Second octave and finally Third octave. As the names of the said octaves are also printed on one of the instruction areas 26 of the chart the child will naturally compare the said names on the chart with the names on the keyboard and thus become acquainted with the said names and their locations on the keyboard. Each of the said instruction areas 26 is provided with a circle or other mark 51 centrally located near the left hand edge thereof. To properly locate the said areas 26 the circle is brought into registry with an arrow 52 marked on the upper surface of and centrally located at the left side of the opening 13.

While I have shown and described my invention as applied to a toy piano, it will be readily understood that it may be incorporated into a regular piano.

From the foregoing it will be seen that I have provided a toy or other piano with means for readily imparting valuable musical instructions to a beginner, child or adult.

Having described my invention what I claim as new and desire to secure by Letters Patent is:

1. In a piano having a keyboard simulating member, a chart divided into instruction areas, some of the instructions on the said areas also being marked on the said keyboard simulating member for the purpose specified.

2. In combination with a piano having a keyboard simulating member, a chart having instruction areas thereon pertaining to the said keyboard simulating member, a frame and means for successively bringing each one of the said areas into view through the said frame.

3. In a toy piano having a keyboard simulating member, an opening in the body portion of the said piano extending to the top surface thereof, a shaft near each of two sides of the said opening rotatably mounted in the said body portion, a roller secured to each of the said shafts within the opening, a pair of rods passing through the opening parallel to the shafts and above same, a chart divided into keyboard instruction areas secured at one end to one of the said rollers then passing from below and one side of the said roller over the rod nearest thereto, thence over the other rod and around the other roller on the same side as the first mentioned roller and secured thereto, knobs for rotating the rollers, an indication on each of the instruction areas and a mark on the piano body at the opening, for the purpose specified.

4. In a toy piano having a keyboard simulating member, an opening in the body portion of the said piano extending to the top surface thereof, a shaft near each of two sides of the said opening rotatably mounted in the said body portion, a roller secured to each of the said shafts within the opening, a pair of rods passing through the opening parallel to the shafts and above same, a chart divided into keyboard instruction areas secured at one end to one of the said rollers then passing from below and one side of the said roller over the rod nearest thereto, thence over the other rod and around the other roller on the same side as the first mentioned roller and secured thereto, hand operated means on the shaft for rotating the rollers, an indication on each of the instruction areas, a mark on the piano body at the opening for the purpose specified, and chart tensioning means in bodily engagement with the said chart.

5. In a toy piano, a pair of rollers rotatably mounted, a pair of rods above and parallel to the said rollers, a chart secured to the said rollers and passing around the said rods in such a manner that upon rotating one of the rollers in a given direction the chart will travel in the same direction, and upon rotating the other roller in the said direction the chart will travel in the opposite direction, and knobs operatively connected to the rollers for the purpose specified.

RENZO VIOLA.